US006942831B2

(12) United States Patent
Greener et al.

(10) Patent No.: US 6,942,831 B2
(45) Date of Patent: Sep. 13, 2005

(54) PROCESS FOR RAPID ANNEALING OF A POLYESTER FILM BASE TO CONTROL FILM CURL

(75) Inventors: Jehuda Greener, Rochester, NY (US); Beverly A. Contestable, Hilton, NY (US); Jeffrey R. Gillmor, Brockport, NY (US); YuanQiao Rao, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 217 days.

(21) Appl. No.: 10/633,183

(22) Filed: Aug. 1, 2003

(65) Prior Publication Data

US 2005/0026088 A1 Feb. 3, 2005

(51) Int. Cl.[7] ........................ B29B 17/00; B29C 71/00; B29C 67/00

(52) U.S. Cl. .................... 264/346; 264/235; 264/235.6; 264/235.8; 264/489; 264/490

(58) Field of Search ................................ 264/346, 235, 264/235.6, 235.8, 489, 490

(56) References Cited

U.S. PATENT DOCUMENTS

| | | | | | |
|---|---|---|---|---|---|
| 4,141,735 | A | * | 2/1979 | Schrader et al. | 430/141 |
| 5,254,445 | A | | 10/1993 | Takamuki et al. | |
| 5,585,229 | A | | 12/1996 | Kawamoto et al. | |
| 5,629,141 | A | | 5/1997 | Kawamoto | |
| 6,485,896 | B2 | * | 11/2002 | Greener et al. | 430/349 |
| 6,558,884 | B1 | | 5/2003 | Greener et al. | |

* cited by examiner

*Primary Examiner*—Stephen J. Lechert, Jr.
(74) *Attorney, Agent, or Firm*—Chris P. Konkol

(57) ABSTRACT

A high-CHDM PET-based support for an imaging element can be annealed relatively rapidly to achieve acceptable core-set and post-process curl properties. The fast annealing response of this material allows effective in-line annealing of the film support, yielding a more efficient manufacturing process with less annealing-induced defects in the imaging support.

20 Claims, No Drawings

PROCESS FOR RAPID ANNEALING OF A POLYESTER FILM BASE TO CONTROL FILM CURL

FIELD OF THE INVENTION

The present invention relates to a process of annealing a high-CHDM PET-based photographic film base for an imaging element. The film base is annealed at elevated temperature to achieve desired levels of post-process curl. In particular, the resin composition of the film base allows the annealing process to be completed in a short time.

BACKGROUND OF THE INVENTION

When a photographic film is wound on a spool it is likely to take up some core-set curl, the extent of which depends on the diameter of the spool, the duration of winding (storage time) and the storage temperature. If the curl exceeds a certain prescribed limit, the film will likely have poor transport in a camera or during photofinishing operations. Because of the tendency to lower the size of film cartridges, hence decrease spool diameter, the problem of maintaining low core-set curl has become more acute. General efforts in this regard have led to the use of a high-Tg film base material, e.g., poly(ethylene naphthalate)(PEN), and costly base annealing procedures as described in U.S. Pat. Nos. 4,141,735; 5,254,445; 5,629,141 and 5,585,229. This material and other similar materials require relatively long annealing times to achieve sufficient reduction in core-set curl.

The core-set propensity of the film is often measured under extreme conditions to simulate long storage times and adverse environmental conditions—the Accelerated Core-Set Test. Such tests are conducted by winding the film tightly around an actual spool and incubating the film at high temperature for a prescribed time, usually 1 day. The wound film is then removed from the oven, allowed to equilibrate for some time at ambient conditions and its curl is measured according to Test Method A in American National Standard Institute (ANSI), P41.29-1985. The post-process curl (PPC) is evaluated by processing the film immediately after it is unwound from the spool in a standard minilab processor and measuring the residual curl of the processed film some prescribed time after the film exits the processor. Here too the curl is measured according to Test Method A in American National Standard Institute (ANSI), P41.29-1985.

Since excessive film curl can cause serious difficulties, in many imaging applications, with film transport and handling during camera use and during subsequent photofinishing, it is important to reduce the core-set propensity of the image-bearing film in accordance with system specifications.

In particular, the curl of a photographic film after photoprocessing (post-process curl) must be kept sufficiently low in order to maintain acceptable performance during various photofinishing steps, e.g., printing, sleeving, autopacking, etc. In conventional 35-mm photographic films based on a cellulose tri-acetate (CTA) support, relatively high core-set curl can be tolerated. This is because a conventional CTA support possesses the capacity to reduce core-set curl during photo-processing and thereby achieve low levels of post-process curl. When using polyester film supports such as PET and PEN, post-process curl can be reduced by lowering the propensity of the film to take up core-set curl in the first place. Over the years many approaches have been taken to reduce core-set curl and/or post-process curl in photographic films. Most approaches are associated with the film base, which normally makes the most significant contribution to the core-set curl produced by the film. These approaches can be generally divided into six categories: (1) high-temperature annealing, (2) inherent curl, (3) ironing, (4) reverse winding, (5) addition of a restraining layer, (6) emulsion reformulation and (7) addition of moisture absorbing layers in a polyester laminate. Each of these approaches is applicable for certain types of films, and selection of one over the other depends on the particular circumstances of the problem at hand. Following is a brief summary of these general approaches.

(1) High temperature annealing. This method is practiced by heating the finished film usually as a wound roll to relatively high temperatures (typically 10 to 40° C. below the glass transition temperature (Tg) for relatively long times (typically>1 day) in order to lower the propensity of the film to take up curl in subsequent winding operations. This method modifies the relaxation characteristics of the film (an aged film relaxes slower than a fresh film) and is especially useful when the final winding diameter of the film is much less than the diameter during annealing. This approach is discussed in U.S. Pat. Nos. 4,141,735; 5,254,445; 5,629,141 and 5,585,229.

(2) Inherent curl. During the manufacture of film support, it is possible to induce curl in a given direction by differentially (asymmetrically) heating the film during the stretching step, i.e., by inducing a temperature gradient of ca. 10–15° C. across the thickness of the film as it is stretched above the glass transition temperature. If this inherent curl is in a direction opposite of the expected core-set curl it will compensate to some extent for the curl induced during winding and will yield lower effective curl. This method requires significant modification of the film manufacturing process and the fine-tuning of the stretching temperature of the material. This approach is considered in U.S. Pat. Nos. 4,892,689 and 4,994,214. The latter combines the inherent curl approach with physical aging; it clearly requires a fundamental change in the film-making process as well as storage for long times at relatively high temperatures.

(3) Ironing. By heating relatively short and narrow film sections to temperatures in the vicinity of Tg, it is possible to remove curl induced by core-set. This method requires some tension as the film is conveyed through the heating device and the heated film must be either flat or slightly curved in a direction opposite of the expected core-set curl. Residence times for this heating method are relatively short, of the order of minutes or less. This method is not ideally suited for treating wide and long-production rolls, however, because of the difficulty of controlling temperature uniformity and the possibility of scratching the film and damaging the coated emulsions within the ironing device. Examples of this approach are discussed in U.S. Pat. Nos. 3,916,022; 4,808,363; 4,851,174 and 5,549,864.

(4) Reverse Winding. By winding the film in the opposite direction of its induced core-set curl, the curl value can be reduced. This can be done in principle at any temperature but the rate of curl change depends on the temperature at which the film is stored and may require very long times to achieve a meaningful reduction in curl at ambient conditions. U.S. Pat. No. 3,806,574 falls under this general category, but the proposed preferred embodiment is not suitable for use in an on-line production mode, since the reverse wound roll must be stored for long times (depending on the original storage time), often greater than one day, to make an effective change in curl. In an attempt to alleviate this problem, U.S. Pat. No. 5,795,512 teaches that a combination of reverse winding and mild heating of the film can effectively reduce core-set curl after relatively short storage times.

(5) Restraining Layer. U.S. Pat. No. 6,071,682 teaches that by coating a thin polymeric layer on the side of the base opposite the emulsion, it is possible to reduce the core-set propensity of the base layer provided that the coated layer is sufficiently thick and that the glass transition temperature of the polymeric layer is equal to or greater than that of the base layer.

(6) Reformulation of the Emulsion Layer. When the base layer is relatively thin, the contribution of the emulsion layer to the overall film core-set can be significant. U.S. Pat. No. 6,485,896 teaches that formulating the emulsion with certain addenda can substantially lower the core-set propensity of the film.

(7) Addition of hydrophilic layers. A reduction in post-process curl of a polyester support can be achieved by use of a multilayered film support comprising polyesters modified by sulfonate and other hydrophilic moieties. This structure facilitates, in photo-processing, recovery of curl imposed on the film during storage in a cartridge. This approach was proposed in U.S. Pat. No. 5,556,739 to Nakanishi et al., U.S. Pat. No. 5,387,501 to Yajima et al., and U.S. Pat. No. 5,288,601 to Greener et al.

Of the above approaches, high temperature annealing is especially effective when dealing with relatively thick non-hydrophilic polyester film supports. However, this approach makes the manufacturing process more complex and less efficient because of the lengthy heating times (typically>1 day) needed to achieve acceptable reduction in core-set curl and post-process curl. Furthermore, because of the lengthy annealing times, the support is usually annealed as a wound roll. This may further prolong the annealing process because of a significant thermal lag for the wound film, and it may also produce various defects, e.g., core impressions, blocking, etc., which can lower yields and productivity.

U.S. Pat. No. 6,558,884 discloses a poly(ethylene terephthalate)-based photographic film base having improved properties with regard to cutting, perforating, and other finishing or photofinishing operations. The film base is made of a poly(ethylene terephthalate)-based material comprising a specified amount of monomeric units derived from 1,4-cyclohexanedimethanol, such that the film base has a specified cutting-related property.

SUMMARY OF THE INVENTION

It has been found that the use of a high-CHDM PET-based support for an imaging element allows the support material to be annealed very rapidly (less than 6 min) to achieve acceptable core-set and post-process curl properties. With this fast annealing process, it is possible to have an effective in-line annealing step to yield a more efficient process with less annealing-induced defects.

DETAILED DESCRIPTION OF THE INVENTION

The present invention is directed to a process of annealing a film base or a film support comprising a film base, which film base or support is used in a silver-halide photographic film comprising at least one emulsion layer coated on the support, with the emulsion layer comprising gelatin as a major component. The method of manufacture of such a film is well known in the art.

In accordance with the process of the invention, the film support is annealed at temperatures between 60° C. and Tg+15° C., preferably 60° C. and Tg+ 10° C. for a time preferably less than 6 minutes, wherein Tg is the glass transition temperature of the unprocessed amorphous polyester material used in the film base of the support. In a preferred embodiment, the post-process curl is less than 60 $m^{-1}$ after annealing and wherein the post-process curl is greater than 70 $m^{-1}$ without annealing. In a preferred embodiment, the support is annealed at a temperature between 80 and 105° C., preferably 85 to 100° C., for less than 6 minutes, preferably less than 4 minutes, more preferably about 3 minutes.

The glass transition temperature (Tg) of a polymer may be determined by differential thermal analysis, preferably by the use of a "differential scanning calorimeter" (DSC). The DSC curve (thermogram) is representative of the changes in the heat capacity of a polymer during controlled heating or cooling through a given temperature range. For a detailed description of this analytical method see "Thermal Characterization of Polymeric Materials", edited by E. A. Turi, Academic Press, New York, 1997. The glass transition temperature of an amorphous polymer is measured using TA Q1000® DSC analyzer (TA instrument, New Castle, Del.). The sample is first heated above its melting temperature and kept for a sufficient time to ensure complete melting and then quickly quenched using liquid nitrogen into an amorphous state. It is then heated at a rate of 10° C./min. From the DSC thermogram, the temperature at which the heat capacity experiences a step change is identified as the glass transition. It should be noted that the glass transition temperature of a biaxially oriented, semicrystalline film is usually 10 to 20° C. higher than the Tg of the amorphous resin but this temperature is not always possible to detect using the standard DSC method described above.

The annealing step can be accomplished by various means. In one embodiment, a heated surface, for example a continuous drum processor, may be used, in which a sheet of the imaging element is fully contacted with the surface of the drum for a specified period of time. Alternatively, the annealing step may be accomplished by the use of heated air, either by forced or free convection. Thus, the heating necessary for annealing may be accomplished by air handling equipment that is typically employed in conventional film manufacture, but which is now set to heat treat the support in the form of a moving web, prior to coating a light-sensitive emulsion onto the support.

The annealing may also be accomplished also by means of a radiant energy source. This could be a direct source of infrared radiation, or an indirect source such as microwave radiation, which produce heat by coupling with the medium to be heated.

In one embodiment of the invention, annealing is accomplished in an in-line step whereby the support is heated as it is conveyed inside and through a suitably constructed oven. This advantageously shortens manufacturing time and reduces potential film defects associated with heating a wound film under finite tension to temperatures close to the Tg of the support material.

The support can comprise, in addition to a polyester film base, various other layers applied onto the film base prior to coating the support with a light-sensitive emulsion. These additional layers can include, for example, subbing layers, antistat layers, magnetic layers, friction control layers and the like.

The polyester film base of said support may be manufactured by a process of casting, biaxial stretching, and heat setting. The process for making PET film base typically comprises the steps of casting a molten PET resin onto a casting surface along the machine direction to form a continuous sheet, drafting the sheet by stretching in the machine direction, tentering the sheet by stretching in the transverse direction, heat setting the drafted and tentered sheet, and cooling the heat-set sheet to form a stretched, heat-set PET film. The conventional aspects of this process are such as described in, e.g., U.S. Pat. No. 4,141,735 to Schrader et al., the disclosure of which is incorporated in its entirety by reference herein. Alternately, the stretching of the film in the machine and transverse directions can be performed simultaneously using appropriate machinery.

In one particular embodiment, the process for preparing films from the resin compositions of this invention comprises the following steps:

(1) The resin is cast under molten conditions upon a cooling surface to form a continuous cast sheet. Preferably, the molten polyester resin has an inherent viscosity of from 0.5 to 0.8 dl/g, and is cast at a temperature of from 250 to 310° C. while the casting surface has a temperature of from 40 to 70° C. The inherent viscosity (IV) is measured at 25° C. in a solvent mixture of phenol/chlorobenzene (60/40 by weight) at a concentration of 0.25 g/dl with a Ubbelhode glass viscometer.

(2) The continuous sheet is removed from the casting surface and passed into a drafting zone where it is first preheated and then stretched in the machine direction at a stretch ratio of 2.0 to 4.0, at a temperature of from about 80° C. to 110° C. The drafting zone typically includes two sets of nipped rollers, the first being the entrance to the drafting zone and the second the exit from the drafting zone. To achieve the stretch ratios necessary for the practice of this invention, the exit nip rollers are rotated at a speed greater than the entrance nip rollers. The film may be cooled in the last stage of the drafting zone to 25° C. to 40° C.

(3) The film moves from the drafting zone into a tentering zone where it is preheated and stretched in the transverse direction at a stretch ratio of 2.0 to 4.0, at a temperature of from about 80° C. to 115° C. The tentering zone typically includes a means for engaging the film at its edges and stretching such that the final width is from 2.0 to 4.0 times that of the original width.

(4) The film is next heat set by maintaining it at a temperature of at least 180° C., but below the melting point of the resin, preferably at least 200° C. to 240° C., while being constrained, as in the tentering zone, for a time sufficient to affect heat-setting. Times longer than necessary to bring about this result are not detrimental to the film; however, longer times are undesired as the lengthening of the zone requires higher capital expenditure without achieving additional advantage. The heat-setting step is typically accomplished within a time period of 0.1 to 15 seconds and preferably 0.1 to 10 seconds. Finally, the film is cooled without substantial detentering (the means for holding the edges of the film do not permit greater than 2% shrinkage thereof).

Typically following the heat setting of the film base and the addition of other support layers prior to emulsion coating, the support is wound on a core for temporary storage. The support can be unwound for in-line annealing. Alternately, the annealing can be done in-line following heat setting of the film base. Following annealing, the support is typically rewound for later transport to the emulsion coating operation.

With respect to the polyester material used in the film base that allows rapid annealing in accordance with the present process, definitions of terms, as used herein, include the following:

By "terephthalic acid," suitable synthetic equivalents, such as dimethyl terephthalate, are included. It should be understood that "dicarboxylic acids" includes the corresponding acid anhydrides, esters and acid chlorides for these acids. Regarding the glycol/diol component or acid component in a polymer or material, the mol percentages referred to herein equal a total of 100 mol %.

"PET polymer," "PET resin," "poly(ethylene terephthalate) resin," and the like refers to a polyester comprising at least 98 mol % terephthalic-acid comonomer units, based on the total acid component, and comprising at least 98 mol % of ethylene-glycol comonomer units, based on the total glycol component. This includes PET resins comprising 100 mol % terephthalic-acid comonomer units, based on the total acid component, and comprising 100 mol % of ethylene-glycol comonomer units, based on the total glycol component.

The term "modified PET polymer," "modified PET resin," or the like is a polyester comprising at least 70 mol % terephthalic-acid comonomer units, based on the total acid component, that has been modified so that either the acid component is less than 98 mol % (including less than 95 mol %) of terephthalic-acid ("TA") comonomer units or the glycol component is less than 98 mol % (including less than 95 mol %) of ethylene glycol ("EG") comonomer units, or both the TA and EG comonomers units are in an amount less than 98 mol % (including less than 95 mol %). The modified PET polymer is modified with, or copolymerized with, one or more other types of comonomers other than terephthalic-acid comonomer and/or ethylene-glycol comonomers, in an amount of greater than 2 mol % % (including greater than 5 mol %) of either the acid component and/or the glycol component, for example, to improve the cuttability of a film base or otherwise change the properties of the film base in which it is used. The "modified PET resin" does not necessarily need to contain any ethylene glycol derived comonomer, and it does not necessarily need to contain any acid component other than terephthalic acid.

The term "CHDM-modified PET" or "CHDM-modified-PET polyester" or "CHDM-modified PET resin" refers to a modified-PET polymer modified by the inclusion of at least 65 mol % CHDM-comonomer units, base don the total glycol component.

Similarly, the term "CHDM-modified polyester" refers to a polyester comprising at least 65 mol % CHDM-comonomer units, based on total glycol component, but not necessarily comprising any specific amount of terephthalic-acid comonomer units.

The term "high-CHDM-modified PET" refers to a CHDM-modified PET polyester in which the level of CHDM-comonomer units is equal to or greater than 95 mol % (including 100 mol %). This includes both "PCT" (polycyclohexylene dimethylene terephthalate) and "PCTA," which is a copolymer of three monomers: terephthalic acid, isophthalic acid and 1,4-cyclohexane dimethanol, with 100 mol % of the 1,4-cyclohexane dimethanol based on its glycol component.

The term "high-CHDM-modified polyester" refers to a CHDM-modified polyester in which the level of CHDM-comonomer units is greater than 95 mol % (including 100 mol %), but not necessarily comprising any amount of terephthalic-acid comonomer units.

"PET-based-polyester material" is a material comprising one or more polymers wherein at least 70% by weight of the material is one or more modified PET polymers. Optionally, the materially may also include addenda such as silica beads, plasticizers, and the like.

The annealed film base comprises a "PET-based-polyester material" in the present invention.

In one embodiment of the invention, a high-CHDM-modified PET resin is blended, using a suitable compounding method, with a polyester containing CHDM-comonomer units at a sufficient level. This resin is then used to prepare a biaxially stretched and heat-set film under conditions similar to those used for preparing PET film base. In another embodiment of this invention a modified-PET resin comprising CHDM comonomer at a sufficient level is used to prepare a biaxially stretched and heat-set film under conditions similar to those used for preparing PET film base. Typically, biaxially stretching the material causes amorphous material to become semicrystalline. In a typical embodiment, the crystallinity is at least 10%.

More particularly, the photographic film base used in the present process comprises a PET-based polyester material comprising one or more polyester resins, in which material the level of repeat units derived from 1,4-cyclohexane dimethanol (CHDM) is overall 65 to 100 mol %, based on total glycol component in the material. Preferably, the film base comprises a material in which the level of repeat units derived from 1,4-cyclohexane dimethanol is 70 to 100 mol %, based on total glycol component in the material.

In the case of a blend, the film base comprises a polyester material comprising a first polyester that is a high-CHDM-modified PET polymer that is blended with a second polyester, the second polyester comprising repeat units derived from 1,4-cyclohexane dimethanol such that the total repeat units derived from 1,4-cyclohexane dimethanol in the polyester materials is at a level between 65 to 100 mol % based on total glycol component in the polyester. All polyester materials in the blend must be miscible, that is, the film produced from said blend must be optically clear, to meet the stringent optical requirements of high transparency and low haze placed on photographic film bases.

More preferably, the repeat units derived from 1,4-cyclohexane dimethanol in the material are at a level of greater than 70, more preferably greater than 75 mol % based on total glycol component in the polyester.

In general, as is well known by the skilled artisan, polyesters comprise the reaction product of at least one dicarboxylic acid and at least one glycol component. The dicarboxylic acid component can typically comprise residues of terephthalic acid, isophthalic acid, 1,4-cyclohexanedicarboxylic acid, 2,6-naphthalenedicarboxylic acid, and/or mixtures thereof. Also suitable are the anhydrides thereof, acid chlorides thereof, and lower, e.g., C1–C8 alkyl esters thereof. Any isomers of the dicarboxylic acid component or mixtures thereof may be used. For example, cis, trans, or cis/trans mixtures of 1,4-cyclohexanedicarboxylic acid may be employed. Examples of suitable naphthalene dicarboxylic acid isomers include 1,4-naphthalenedicarboxylic acid, 2-6-naphthalenedicarboxylic acid, 2,7-naphthalenedicarboxylic acid or mixtures thereof.

In one embodiment, the CHDM-modified-PET polyesters used in the film base comprise copolyesters having a dicarboxylic acid component and a glycol component, the dicarboxylic acid component comprising repeat units from at least 80 mol % terephthalic acid (or its ester) and the glycol component comprising at least 65 mol %, preferably 70 to 100 mol %, of repeat units from 1,4-cyclohexane dimethanol and about 0 to 35 mol % from another glycol, preferably 5–30 mol % from ethylene glycol.

The CHDM-modified-PET polyesters used in making the articles of this invention preferably have about 100 mol % of a dicarboxylic acid portion and about 100 mol % of a glycol portion. Less than about 20 mol %, preferably not more than about 10 mol % of the dicarboxylic acid repeat units may be from other conventional acids such as those selected from succinic, glutaric, adipic, azelaic, sebacic, fumaric, maleic, itaconic, 1,4-cyclohexane-dicarboxylic, phthalic, isophthalic, and naphthalene dicarboxylic acid.

Preferably, the glycol component of the CHDM-modified-PET polyesters contains repeat units comprising from 65 to 100 mol % of 1,4-cyclohexane dimethanol and from about 0 to 35 mol % of ethylene glycol. The glycol component may optionally include less than 35 mol %, preferably not more than about 10 mol % of other conventional glycols such as propylene glycol, 1,3-propanediol; 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexanedimethanol, 1,3-cyclohexanedimethanol, 2,2,4,4-tetramethyl-1,3-cyclobutanediol and the like.

In the case of embodiments involving blends, a blend comprising at least one high-CHDM-modified PET polymer blended with a suitable CHDM-modified polyester, such that the total content of the CHDM-comonomer units in the blend is 65 to 100 mol %, preferably at least 70 mol %, more preferably at least 75 mol %. In the CHDM-modified polyester, any of the above-mentioned acid components may be used and any of the above glycol components may be used in addition to the CHDM component.

Another embodiment of the invention involves annealing a film base comprising a PET-based polyester material comprising one or more polyester resins, in which material the level of repeat units derived from 1,4-cyclohexane dimethanol, based on the total glycol component, is 65 to 100 mol %, and the level of repeat units derived from an acid component other than terephthalic acid or its ester is in the amount of 3 to 30 mol %, preferably 5 to 20, based on the total acid component.

The acid component other than terephthalic acid can, for example, include isophthalic acid (IPA), dimethyl isophthalate, 1,4-cyclohexanedicarboxylic acid (1,4-CHDA), 1,4 cyclohexanediacetic acid, diphenyl-4,4-dicarboxylic acid, dimethyl-2,6-naphthalene-dicarboxylate, succinic acid, glutaric acid, adipic acid, azelaic acid, sebacic acid, paraphenylenedicarboxylic acid (PPDA), naphthalene-dicarboxylic acid (NDA), and mixtures thereof. Preferably, the other acid component is isophthalic acid (IPA), 1,4-cyclohexanedicarboxylic acid (1,4-CHDA), paraphenylene-dicarboxylic acid (PPDA), naphthalenedicarboxylic acid (NDA), and the like, and mixtures thereof.

Preferably, in one embodiment, a blend comprises a poly cyclohexanedimethylene terephthalate (PCT) polymer and a CHDM-modified polymer in the ratio of 95:5 to 5:95, more preferably 80:30 to 20:70. Preferably, the level of the CHDM-comonomer units in the CHDM-modified polymer is 65 to 95. Preferably, the blend comprises a poly cyclohexanedimethylene terephthalate (PCT) polymer and a CHDM-modified polymer in the ratio of 95:5 to 5:95. Preferably, the total content of the CHDM comonomer units in the CHDM-modified polymer is 65 to 95 mol %.

In one embodiment, a preferred CHDM-modified PET for use in the present invention is represented by the following structure:

I

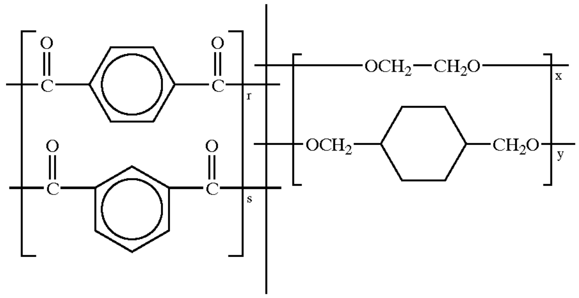

In Structure (I) above, the subscripts x and y represent the mol %, based on the total glycol component of the comonomer. Preferably, as indicated above, x is 0 to 35 mol % and y is between 65 and 100 mol %, s is 0 to 30 mol % and r is 70 to 100 mol %. In one embodiment s is at least 3 percent, particularly when y is above 95 mol %. In another embodiment, y is 65 to 95 mol %.

The polyester polymers used in the present invention can be prepared by a process comprising reacting the dicarboxylic acid component and the glycol component at temperatures sufficient to effect esterification or ester exchange and polycondensing the reaction product under an absolute pressure of less than 10 mm Hg for a time of less than about 2 hours in the presence of a catalyst and inhibitor system. An example of a preferred catalyst and inhibitor system is about 0–75 ppm Mn, about 50–150 ppm Zn, about 5–200 ppm Ge, about 5–20 ppm Ti and about 10–80 ppm P, all parts by weight based on the weight of the copolyester.

Either dimethyl terephthalate (or other lower dialkyl terephthalate ester) or terephthalic acid can be used in producing the copolyester. Thus, the term "terephthalic acid component, monomer, repeat unit, or portion" herein is meant to include either the acid or ester form. These materials are commercially available. The glycols CHDM and ethylene glycol are also commercially available. Either the cis or trans isomer of CHDM, or mixture thereof, may be used in accordance with the present invention.

Generally, the copolyesters may be produced using conventional polyesterification procedures described, for example, in U.S. Pat. Nos. 3,305,604 and 2,901,460, the disclosures of which are incorporated herein by reference. The amorphous or semi-crystalline copolyesters according to the invention are prepared by conventional polymerization processes known in the art, such as disclosed by U.S. Pat. Nos. 4,093,603 and 5,681,918, the disclosures of which are herein incorporated by reference. Examples of polycondensation processes useful in making the PET material of the present invention include melt phase processes conducted with the introduction of an inert gas stream, such as nitrogen, to shift the equilibrium and advance to high molecular weight or the more conventional vacuum melt phase polycondensations, at temperatures ranging from about 240° C. to about 300° C. or higher, which are practiced commercially. Although not required, conventional additives may be added to the copolyester materials of the invention in typical amounts. Such additives include pigments, colorants, stabilizers, antioxidants, extrusion aids, slip agents, carbon black, flame retardants and mixtures thereof.

Various modified-PET polyesters of the present invention comprising repeat units derived from CHDM are commercially available from Eastman Chemical Company (Kingsport, Tenn.) under the trademark EASTAPAK and EASTAR copolyesters, as described in http://www.eastman.com.

As indicated above, the support of the present invention can contain other components, in addition to the film base, commonly found in film supports for photographic elements. These include dyes, lubricants and particles of organic or inorganic materials such as glass beads, filler particles, magnetic particles and antistatic agents. These are described in more detail in *Research Disclosure*, February 1995, Item 37038, pages 79–114 and *Research Disclosure*, September 1996, Item 38957, pages 591–639.

The film base can bear layers commonly found on film support used for photographic elements. These include magnetic layers, subbing layers between other layers and the support, photosensitive layers, interlayers and overcoat layers, as are commonly found in photographic elements. These layers can be applied by techniques known in the art and described in the references cited in Research Disclosure, Item 37038 cited above.

Magnetic layers that can be used in photographic elements of this invention are described in U.S. Pat. Nos. 3,782,947; 4,279,975; 5,147,768; 5,252,441; 5,254,449; 5,395,743; 5,397,826; 5,413,902; 5,427,900; 5,432,050; 5,434,037; 5,436,120; in *Research Disclosure*, November 1992, Item 34390, pages 869. and in Hatsumei Kyonkai Gihou No. 94–6023, published Mar. 15, 1995, by Hatsumei Kyoukai, Japan.

Subbing layers are used for the purpose of providing an adhesive force between the polyester support and an overlying photographic emulsion comprising a binder such as gelatin, because a polyester film is of a very strongly hydrophobic nature and the emulsion is a hydrophilic colloid. If the adhesion between the photographic layers and the support is insufficient, several practical problems arise such as delamination of the photographic layers from the support at the cut edges of the photographic material, which can generate many small fragments of chipped-off emulsion layers, which then cause spot defects in the imaging areas of the photographic material.

Various subbing processes and materials have, therefore, been used or proposed in order to produce improved adhesion between the support film and the hydrophilic colloid layer. For example, a photographic support may be initially treated with an adhesion promoting agent such as, for example, one containing at least one of resorcinol, catechol, pyrogallol, 1-naphthol, 2,4-dinitro-phenol, 2,4,6-trinitrophenol, 4-chlororesorcinol, 2,4-dihydroxy toluene, 1,3-naphthalenediol, 1,6-naphthalenediol, acrylic acid, sodium salt of 1-naphthol-4-sulfonic acid, benzyl alcohol, trichloroacetic acid, dichloroacetic acid, o-hydroxybenzotrifluoride, m-hydroxybenzotrifluoride, o-fluorophenol, m-fluorophenol, p-fluorophenol, chloralhydrate, and p-chloro-m-cresol. Polymers are also known and used in what is referred to as a subbing layer for promoting adhesion between a support and an emulsion layer. Examples of suitable polymers for this purpose are disclosed in U.S. Pat. Nos. 2,627,088; 2,968,241; 2,764,520; 2,864,755; 2,864,756; 2,972,534; 3,057,792; 3,071,466; 3,072,483; 3,143,421; 3,145,105; 3,145,242; 3,360,448; 3,376,208; 3,462,335; 3,475,193; 3,501,301; 3,944,699; 4,087,574; 4,098,952; 4,363,872; 4,394,442; 4,689,359; 4,857,396; British Patent Nos. 788,365; 804,005; 891,469; and European Patent No. 035,614. Often these include polymers of monomers having polar groups in the molecule such as carboxyl, carbonyl, hydroxy, sulfo, amino, amido, epoxy or acid anhydride groups, for example, acrylic acid, sodium acrylate, methacrylic acid, itaconic acid, crotonic acid, sorbic acid, itaconic anhydride, maleic anhydride, cinnamic acid, methyl vinyl ketone, hydroxyethyl acrylate, hydroxyethyl methacrylate, hydroxychloropropyl methacrylate, hydroxybutyl acrylate, vinylsulfonic acid, potassium vinylbenezensulfonate, acrylamide, N-methylamide, N-methylacrylamide, acryloylmorpholine, dimethylmethacrylamide, N-t-butylacrylamide, diacetonacrylamide, vinylpyrrolidone, glycidyl acrylate, or glycidylmethacrylate, or copolymers of the above monomers with other copolymerizable monomers. Additional examples are polymers of, for example, acrylic acid esters such as ethyl acrylate or butyl acrylate, methacrylic acid esters such as methyl methacrylate or ethyl methacrylate or copolymers of these monomers with other vinylic monomers; or copolymers of polycarboxylic acids such as itaconic acid, itaconic anhydride, maleic acid or maleic anhydride with vinylic monomers such as styrene, vinyl chloride, vinylidene chloride or butadiene, or trimers of these monomers with other ethylenically unsaturated monomers. Materials used in adhesion-promoting layers often comprise a copolymer containing a chloride group such as vinylidene chloride.

The support of the present invention may be treated with corona discharge (CDT), UV, glow discharge (GDT), flame or other such methods that enhance adhesion of the support surface. The preferred method is the glow discharge treatment as described in U.S. Pat. No. 5,425,980 incorporated herein by reference.

As indicated above, the support comprising the film base is used in a photographic element comprising at least one silver-halide imaging layer over a support comprising a film base. Such a photographic element can be a photographic film or a photothermographic film.

Photographic elements processed in accordance with this invention can have the structure and components shown in *Research Disclosures*, Items 37038 and 38957 cited above and can be imagewise exposed and processed using known techniques and compositions, including those described in the *Research Disclosures* Items 37038 and 38957 cited above.

The present invention is described in greater detail below by referring to the Examples. However, the present invention should not be construed as being limited thereto.

EXAMPLES

Materials:

The following polyester materials were used in the examples described below:

1) EASTAPAK® PET Polyester 7352 (Trademark of Eastman Chemical Company, USA) is a poly(ethylene terephthalate) resin. Its glass transition temperature is 77° C. (as unprocessed amorphous resin).
2) EASTAR® Copolyester A150 (Trademark of Eastman Chemical Company, USA) is a high CHDM poly (ethylene terephhalate)-based resin. This resin is a copolyester comprising three monomers: terephthalic acid, isophthalic acid and CHDM with 100 mol % of 1,4-cyclohexane dimethanol as its diol component, and approximately 17 mol % of isophthalic acid and 83 mol % of terephthalic acid as its diacid components. Its glass transition temperature is 89° C. (as unprocessed amorphous resin).

Film Formation:

The materials listed above were processed into film by first drying the pellets of said materials under suitable conditions. The pellets were then melted at 280–290° C. using a single screw extruder, and cast onto an electrostatically charged casting drum to prepare a cast sheet. The cast sheet obtained was stretched sequentially 3.4 times in the machine and transverse directions. The stretched films were heat set at a temperature of approx. 220° C. The final thickness of the PET film was 118 μm and that of the Eastar A150 film was 123 μm.

Comparative Example 1

This comparative example shows the core-set and post-process curl properties of a film base that is not annealed. A polyester film base was prepared from Eastar A150® (Trademark of Eastman Chemical Company, USA) polyester resin. The film was produced using the process of melt extrusion and sequential biaxial stretching described above. The core-set (CS) and post-process curl (ppCurl) of the film of this example and other films of this invention were measured as follows:

Three lengthwise strips 75 mm×15 mm were cut along the machine direction and equilibrated at 23° C./50% RH for 16 hr. The strips were then wound on 10.8 mm-diameter plastic cores and stored for 24 hrs in sealed bags at 55° C. After storage in a wound state, the films were unwound and their acquired core-set curl measured. The curl measured at this stage is the reported core-set curl (CS). The curled films were then processed in a Noritsu® V50 minilab processor operated under standard conditions and the curl of the processed and dried films was read approximately one hour after processing. The average curl value measured at this stage is the reported post-process curl (PPC). The curl measurements for both CS and PPC follow Test Method A in ANSI P41.29-1985.

The CS and PPC values for the unannealed sample are listed in Table 1.

Examples 2 to 7

The film base of Example 1 was annealed in a convection oven in accordance with the present invention. The annealing conditions used are listed in Table 1 below together with the corresponding values of the measured CS and PPC.

Comparative Examples 8 and 9

The film base of Example 1 was annealed at a temperature higher than claimed in the present invention. The annealing conditions are listed in Table 1 together with the corresponding values of the measured CS and PPC.

Comparative Example 10

This is the same as Example 1 (unannealed base) except that the film base was prepared from the PET resin (EASTAPAK PET Polyester 7352). The corresponding values of CS and PPC are listed in Table 1.

Comparative Examples 11 to 16

These examples are the same as Examples 2 to 7 (annealed base) except that the film base was prepared from the PET resin (EASTAPAK PET Polyester 7352). The annealing conditions and the corresponding measured values of CS and PPC are listed in Table 1 below.

TABLE 1

| Example | Material | CS (l/m) | PPC (l/m) | Anneal Time (min) | Anneal Temp. (° C.) |
|---|---|---|---|---|---|
| 1 (Comparison) | EASTAR* A150 | 103 | 76 | NA | NA |
| 2 (Invention) | EASTAR A150 | 94 | 58 | 3 | 90 |
| 3 (Invention) | EASTAR A150 | 72 | 54 | 7.5 | 90 |
| 4 (Invention) | EASTAR A150 | 79 | 58 | 3 | 95 |
| 5 (Invention) | EASTAR A150 | 70 | 55 | 7.5 | 95 |
| 6 (Invention) | EASTAR A150 | 78 | 59 | 3 | 100 |
| 7 (Invention) | EASTAR A150 | 74 | 55 | 7.5 | 100 |
| 8 (Comparison) | EASTAR A150 | 79 | 64 | 3 | 105 |
| 9 (Comparison) | EASTAR A150 | 78 | 61 | 7.5 | 105 |
| 10 (Comparison) | PET | 98 | 81 | NA | NA |
| 11 (Comparison) | PET | 91 | 71 | 3 | 80 |
| 12 (Comparison) | PET | 84 | 69 | 7.5 | 80 |
| 13 (Comparison) | PET | 88 | 70 | 3 | 85 |
| 14 (Comparison) | PET | 83 | 70 | 7.5 | 85 |
| 15 (Comparison) | PET | 89 | 70 | 3 | 90 |
| 16 (Comparison) | PET | 86 | 69 | 7.5 | 90 |

*Easter is a registered trademark of Eastman Chem. Co.

It is seen from the results in Table 1 that with the support material of this invention, relatively short annealing times (<7.5 min) can be used at the appropriate temperature range to achieve post-process curl levels below 60 $m^{-1}$. With such short times it is possible to conduct the annealing step using an in-line annealing operation that would not require excessive space. The in-line annealing process is also more efficient and less likely to induce surface defects in the annealed film support.

The invention has been described in detail with particular reference to certain preferred embodiments thereof, but it will be understood that variations and modifications can be effected within the spirit and scope of the invention.

What is claimed is:

1. A process for reducing core-set and/or post-process curl in an imaging element in which the support layer comprises a biaxially stretched, semicrystalline film base of a PET-based polyester material comprising one or more polyester resins, in which material the total level of repeat units derived from 1,4-cyclohexane dimethanol is 65 to 100 mol %, based on total glycol component in the material, said process comprising annealing the support at temperatures between 60° C. and Tg+15° C. for a time less than 6 min, wherein Tg is the glass transition temperature of the unprocessed amorphous polyester material.

2. The process of claim 1 wherein the post-process curl is less than 60 $m^{-1}$ after annealing.

3. The process of claim 1 wherein the film base comprises a PET-based polyester material in which the level of repeat units derived from an acid component other than terephthalic acid or its ester is in the amount of 3 to 30 mol %, based on the total acid component.

4. The process of claim 1 wherein the film base comprises a PET-based polyester material in which the total level of repeat units derived from 1,4-cyclohexane dimethanol is 65 to 95 mol %, based on total glycol component in the material.

5. The process of claim 1 wherein the film base is manufactured by a process of melt extrusion, casting, biaxial stretching and heat-setting.

6. The process of claim 5 wherein the support comprised of said film base is subsequently wound on a core.

7. The process of claim 6 comprising, prior to annealing, unwinding the support from the core and conveying said support in the form of a moving web through or past a heating means for annealing the support.

8. The process of claim 7, wherein after annealing the support by said heating means, the support is cooled and rewound again for use in subsequent operations.

9. The process of claim 1 wherein the support is annealed when in the form of a moving web.

10. The process of claim 1 wherein the support is annealed in-line immediately after manufacturing the film base, before the support is wound on a core.

11. The process of claim 1 wherein the support, after annealing, is immediately wound into an insulated enclosure.

12. The process of claim 1 in which the level of repeat units derived from 1,4-cyclohexane dimethanol is at least 70 mol %, based on total glycol component in the material.

13. The process of claim 1 wherein the PET-based polyester material comprises a blend comprising at least two polyesters, a first polyester being a high-CHDM-modified PET polyester in which the level of CHDM-comonomer units is above about 95 mol %, and a second polyester comprising repeat units derived from 1,4-cyclohexane dimethanol, wherein the total repeat units derived from 1,4-cyclohexane dimethanol in the PET-based polyester material is at a level of 65 to 100 mol % based on total glycol component in the polyester material.

14. The process of claim 13, wherein the first polyester comprises 100% of CHDM-monomer, based on the glycol component in the first polyester.

15. The process of claim 13 wherein the second polyester is a CHDM-modified-PET polyester.

16. The process of claim 1 wherein the repeat units derived from 1,4-cyclohexane dimethanol is at a level of above 75 mol % based on total glycol component in the PET-based polyester material.

17. The process of claim 3 wherein the acid component other than terephthalic acid is selected from the group consisting of isophthalic acid (IPA), 1,4-cyclohexanedicarboxylic acid (1,4-CHDA), paraphenylenedicarboxylic acid (PPDA), naphthalenedicarboxylic acid (NDA) and derivatives thereof.

18. The process of claim 1 wherein at least one light-sensitive or heat-sensitive imaging layer is coated over the support following annealing of the support.

19. The process of claim 3 wherein the film base comprises a PET-based polyester material comprising one or more polyester resins, in which material the total level of repeat units derived from 1,4-cyclohexyane dimethanol, based on the total glycol component in the material, is 65 to 100 mol %, and wherein the level of repeat units derived from an acid component other than terephthalic acid or its ester is in the amount of 3 to 30 mol %, based on the total acid component, wherein the acid component other than terephthalic acid is selected from the group consisting of isophthalic acid (IPA), 1,4-cyclohexanedicarboxylic acid (1,4-CHDA), paraphenylenedicarboxylic acid (PPDA), naphthalenedicarboxylic acid (NDA) and derivatives thereof.

20. The process of claim 1 wherein said annealing is conducted by means of contact with a heated surface, by the use of heated convected air, by the use of a radiant energy source, or by a combination thereof.

* * * * *